June 3, 1969  K. G. KREUTER  3,447,569
PRESSURE RESPONSIVE CONTROL DEVICE
Filed Feb. 27, 1967
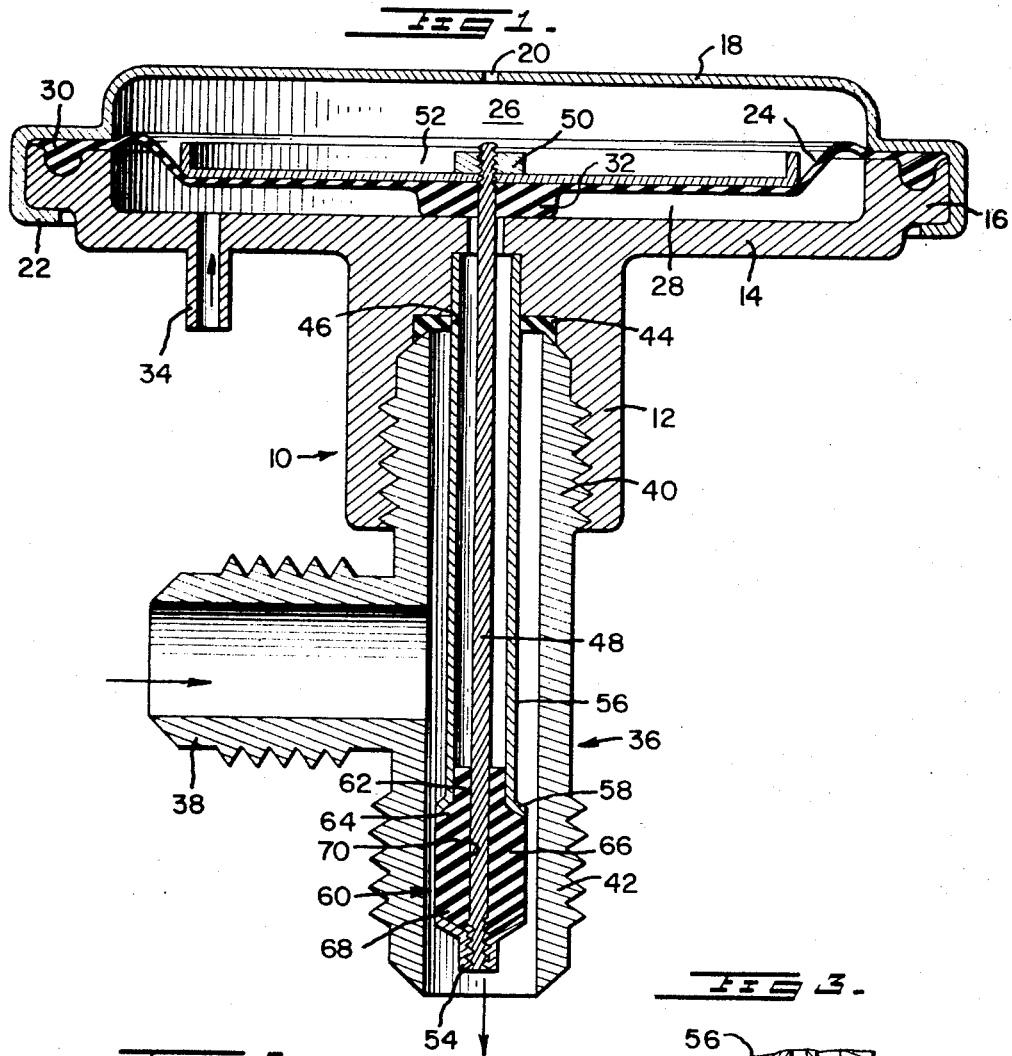
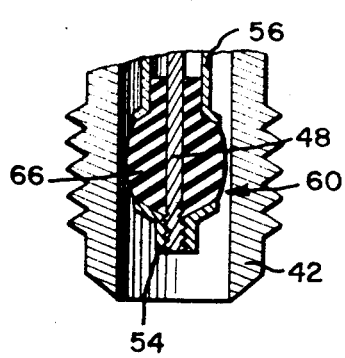
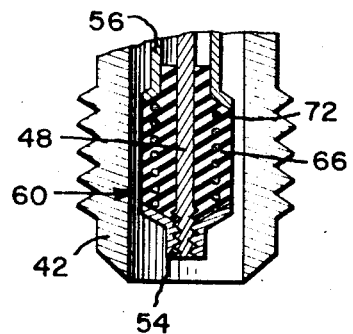
INVENTOR
KENNETH G. KREUTER
BY Anthony A. O'Brien
ATTORNEY United States Patent Office 3,447,569
Patented June 3, 1969

3,447,569
PRESSURE RESPONSIVE CONTROL DEVICE
Kenneth G. Kreuter, Goshen, Ind., assignor to Robertshaw Controls Company, Richmond, Va., a corporation of Delaware
Filed Feb. 27, 1967, Ser. No. 618,889
Int. Cl. F15d 1/08; F16k 31/145
U.S. Cl. 138—46                                    6 Claims

ABSTRACT OF THE DISCLOSURE

A control device having a pneumatically operated pressure regulator assembly, a valve assembly including a deformable resilient plug for controlling fluid flow through a valve body, and a force transmitting mechanism including a rigid stem interconnecting the two assemblies so that the plug is deformed within the valve body to vary the fluid flow through the valve body in accordance with a pressure signal applied to the regulator assembly.

---

This invention relates generally to pressure responsive control devices, and more particularly to pneumatically-operated control devices for controlling the flow of a fluid through a conduit.

An object of this invention is to provide a control device wherein a pneumatic pressure signal applied to a pressure responsive member determines the rate of flow through the conduit operatively associated with such member.

Another object is to position a resilient plug in the conduit to function as an infinitely variable valve in response to axial forces exerted thereupon.

Another object is to interconnect the pressure responsive member of a control device with a resilient plug in such a manner that the fluid flow through the control is proportional to the magnitude of a pneumatic pressure signal applied to the pressure responsive member.

Still another object is to place a wire spring within the resilient plug to increase its service life and/or to preload the valve to a desired minimum pressure.

Yet another object is to isolate the pressure responsive member from the fluid flow through the conduit, thus obviating fouling of the former member.

This invention has additional objects in that this control device employs a minimum number of parts, is simple to fabricate and assemble, and can be readily installed and serviced.

In practicing the present invention, a pressure responsive control device is constructed and arranged to include a housing having inlet and outlet ports, the inlet port adapted to be connected to a source of pneumatic pressure, the outlet port communicating with ambient pressure, a pressure responsive member disposed within the housing for regulating the pneumatic pressure between the inlet and outlet ports, a body member having an inlet conduit and an outlet conduit, the inlet conduit adapted to be connected to a source of fluid and the outlet conduit discharging such fluid, a deformable valve disposed between the inlet and outlet conduits, and a force-transmitting mechanism interconnecting the pressure responsive member and the deformable valve so that the fluid flow through the body is varied in proportion to the pneumatic pressure signal applied to the pressure responsive member.

Other objects and advantages of the present invention will become apparent from the following description of a preferred embodiment construed in conjunction with the accompanying drawing wherein:

FIG. 1 is a vertical cross-section through a pressure responsive control device constructed in accordance with the principles of this invention, such device being shown prior to the application of a pressure signal;

FIG. 2 is a partial cross-section of a detail of FIG. 1 shown in a fluid flow controlling position; and FIG. 3 is a partial cross-section of a modification of a detail of FIG. 1.

As is illustrated in FIG. 1, a preferred embodiment of the present invention includes a substantially cylindrical casing, indicated generally by reference character 10. Casing 10 has a T-shaped cross section defined by a centrally bored vertical conduit 12 and a centrally bored horizontal wall 14. A vertical extension on the circumference of the wall 14 defines an annularly grooved flange 16. An inverted cup-shaped cover 18 has an atmospheric port 20 in one wall and has an annular flange 22 on its peripheral lip which is deformed in to a U-shaped configuration to define a clamping flange.

A flexible diaphragm 24 separates the central hollow portion between the casing wall 14 and the cover 18 into upper and lower chambers 26 and 28, respectively. The periphery of the diaphragm 24 has an annular sealing bead 30 nesting in the grooved flange 16 whereby the diaphragm is supported and sealed at its periphery by means of the clamping flange 22. The central portion of diaphragm 24 is enlarged into an annular boss 32 extending into chamber 28.

The upper chamber 26 defines an atmospheric pressure chamber that communicates with the atmosphere through the cover port 20. The lower chamber 28 defines a signal pressure chamber and the casing wall 14 has a port 34 whereby the chamber 28 will receive a signal pressure as will be explained more fully hereinafter.

A valve body, indicated generally by reference numeral 36, includes a first horizontal conduit 38, a second upwardly opening conduit 40, and a third downwardly opening conduit 42. Conduit 40 is externally threaded so that valve body 36 can be screwed into mating engagement with vertical conduit 12, as seen in FIG. 1. A rubber or soft plastic washer 44 having a central aperture 46 is positioned with bore 12 to seal the joint formed between casing 10 and body 36.

A metal valve stem 48 extends vertically downward from chamber 26 in casing 10 into conduit 42 of body 36. A nut 50 is secured to the uppermost end of stem 48 and holds a pressure plate 52 in position atop diaphragm 24 while a Y-shaped cap 54 is secured to the lowermost end of stem 48. A tubular sleeve 56 with an outwardly flared end 58 surrounds stem 48 along the major portion of its length.

A resilient rubber plug, indicated generally by reference numeral 60, is positioned within conduit 42. Such plug is formed with a neck portion 62, a tapered shoulder section 64, a cylindrical body 66 and a sloping base 68. An axial slot 70 extends throughout the length of the plug.

Base 68 of the plug is seated upon cap 54 so that neck portion 62 fits within sleeve 56 and flared end 58 engages shoulder section 64 of the plug to maintain the desired axial alignment of the plug. Thus, cylindrical body 66 is spaced from the interior bore of conduit 42 to permit fluid flow therebetween. Manifestly, when an axially directed compressive force is imparted to plug 60, the unsupported body 66 of the plug will bulge outwardly to reduce the space between body 66 and the interior bore of conduit 42, as seen in FIG. 2.

The above described structural configuration functions in the following manner as depicted in FIGS. 1 and 2. It is assumed that port 34 communicates with a source of pneumatic pressure, such as a pneumatic transmitter of conventional design, and that conduit 38 communicates with a source of fluid and serves as an inlet therefor and conduit 42 serves as an outlet conduit. Both the pneumatic and fluid flow paths are indicated by appropriate arrows in FIG. 1.

In the absence of a pneumatic signal being applied to lower chamber 28 through port 34, diaphragm 24 will flex downwardly to assume the position seen in FIG. 1. Such flexure is due to the weight of boss 32, plate 52, and the force transmitting mechanism secured thereto. When a pneumatic pressure signal is applied to chamber 28 via port 34, the force on the underside of diaphragm 24 will exceed the downward force on the topside of the diaphragm, thereby causing the diaphragm to move upwardly in seeking an equilibrium position and simultaneously move the pressure plate 52 upwardly.

Plate 52, in turn, exerts an upwardly directed axial force upon valve stem 48 through nut 50, and stem 48 and cap 54 move upwardly with plug 60 supported thereon. These members move relative to sleeve 56, which is immobile since its upper end is securely engaged against a shoulder formed within vertical conduit 12. Accordingly, this relative movement between the flared end 58 on sleeve 56 and the cap 54 on stem 48 exerts a compressive force upon resilient plug 60 and forces the unsupported sidewall of body 66 to bulge outwardly as seen in FIG. 2.

The deformed sidewall decreases the clearance between the plug and the interior bore of conduit 42 through which the flow of fluid will be discharged. The extent to which the sidewall of body 66 will be deformed is directly proportional to the magnitude of the compressive force exerted between flared end 58 and cap 54. Such compressive force is directly related to the upward movement of diaphragm 24, which, in turn, is a function of the pneumatic pressure applied to chamber 28 via port 34. Manifestly, the fluid flow through conduit 42 is inversely proportional to the magnitude of the pneumatic pressure signal applied to diaphragm 24.

Sleeve 56 and washer 44 prevent any fluid that may accumulate within conduit 42 when plug body 66 is deformed from entering lower chamber 28. Isolation of the fluid flow from the pneumatic pressure enhances the operational characteristics of the control device.

FIG. 3 illustrates the lowermost axial portion of a modification of a pneumatically operated control device. In the following description of FIG. 3, identical reference numerals are employed for identical parts previously described above. Reference numeral 72 indicates a helical wire spring located within body 66 of plug 60. Spring 72 constitutes the distinguishing structural feature of this alternative embodiment, which functions in the same manner as the plug shown in FIGS. 1 and 2.

Spring 72 is molded in unstressed condition into the body 66 of plug 60 radially inwardly of the unsupported sidewall of the body. Spring 72 enhances the resiliency of plug 60, particularly after repeated usuage, and thereby increases the service life of the plug. Furthermore, spring 72 assists in preventing fluid from entering tubular sleeve 56 and the lower chamber even when the sidewall of body is fully deformed and approaches the interior bore of conduit 42 to completely cut off fluid flow through such member.

Alternatively, spring 72 may be molded in compression into plug 60 to function as a preloading mechanism for the control device, thereby altering the range of pressures over which plug 60 will be proportionally distended in response to the upward movement of the diaphragm and valve stem 48. The degree of preloading can be further varied by fabricating each plug 60 with a spring 72 mounted therein in a different stage of compression, or alternatively, by selecting a spring 72 of greater or lesser strength.

Obviously, the above-described embodiments of the pneumatically-operated control device are subject to many modifications, variations and changes in details which fall within the spirit and scope of the appended claims. For example, tensioning forces could be applied to plug 60 to reduce its cross-sectional area by introducing a negative pressure or suction signal into chamber 28 via port 36, thereby permitting an increase in fluid flow through conduit 42 in direct proportion to the pressure supplied to the lower chamber and the underside of the diaphragm. Accordingly, such claims should be broadly construed commensurate with the advances in the arts and sciences achieved by this invention.

What is claimed is:

1. A pressure-operated flow control device comprising
   a casing having an opening therein,
   diaphragm means in said casing separating the same into a pair of opposed pressure chambers,
   a valve body connected to said casing and having an opening therein in alignment with said casing opening,
   said valve body having inlet and outlet means and a flow conduit therebetween,
   a valve stem movably extending on a longitudinal axis through the valve body opening and said casing opening having one end connected to said diaphragm means for movement therewith and another end disposed in said flow conduit,
   a deformable, cylindrical valve element secured to the said another end of said valve stem and having a longitudinal axis coinciding with the longitudinal axis of said valve stem,
   closure means for said valve body opening disposed in abutting relation with a portion of said valve element transverse to its longitudinal axis,
   said valve element being deformed by movement of said valve stem to vary a transverse flow area of said flow conduit whereby a flow therethrough is correspondingly varied, and
   port means in said casing for one of said pressure chambers to supply a signal pressure to said diaphragm means whereby said diaphragm means, said valve stem and said valve element are moved to control the flow through said flow conduit in response to variations in said signal pressure.

2. The invention as recited in claim 1 wherein said valve element comprises a rubber plug deformable by compression along its longitudinal axis to decrease the transverse flow area of said flow conduit.

3. The invention as recited in claim 1 wherein said valve element comprises a rubber plug being deformable along its longitudinal axis and having a helical spring longitudinally disposed in said rubber plug to enhance resiliency thereof.

4. The invention as recited in claim 1 wherein said closure means comprises a tubular sleeve surrounding a portion of said valve stem and being fixed in said casing, said tubular sleeve having a flared end defining its abutting relation with the transverse portion of said valve element.

5. The invention as recited in claim 4 wherein said diaphragm means comprises a flexible diaphragm having a central annular boss on one side and having a centrally disposed plate on its opposite side.

6. The invention as recited in claim 4 wherein said valve body comprises a T-shaped pipe fitting having one leg secured to said casing and having its other two legs defining said inlet and outlet means.

References Cited

UNITED STATES PATENTS

| | | |
|---|---|---|
| 2,401,237 | 5/1946 | Gamble. |
| 3,237,914 | 3/1966 | Alix _____ 251—61.2 |
| 3,251,386 | 5/1966 | Bellato _____ 141—279 |
| 3,322,142 | 5/1967 | Baumann _____ 251—61 X |
| 3,354,897 | 11/1967 | Koch et al. _____ 251—61 X |
| 3,368,787 | 2/1968 | Sachnik et al. _____ 251—63.5 |

FOREIGN PATENTS

| | | |
|---|---|---|
| 595,882 | 4/1960 | Canada. |
| 1,102,777 | 5/1955 | France. |

ARNOLD ROSENTHAL, *Primary Examiner.*

U.S. Cl. X.R.

251—61.2, 189, 358